(12) United States Patent
Ernst

(10) Patent No.: US 8,354,457 B2
(45) Date of Patent: Jan. 15, 2013

(54) HYDROCARBON SYNTHESIS

(75) Inventor: Werner Siegfried Ernst, Secunda (ZA)

(73) Assignee: Sasol Technology (Proprietary) Limited (ZA)

( * ) Notice: Subject to any disclaimer, the term of this patent is extended or adjusted under 35 U.S.C. 154(b) by 96 days.

(21) Appl. No.: 12/921,718

(22) PCT Filed: Mar. 9, 2009

(86) PCT No.: PCT/IB2009/050969
§ 371 (c)(1),
(2), (4) Date: Sep. 9, 2010

(87) PCT Pub. No.: WO2009/113006
PCT Pub. Date: Sep. 17, 2009

(65) Prior Publication Data
US 2011/0009501 A1 Jan. 13, 2011

Related U.S. Application Data

(60) Provisional application No. 61/035,765, filed on Mar. 12, 2008.

(30) Foreign Application Priority Data

Mar. 12, 2008 (ZA) .................................. 2008/02340

(51) Int. Cl.
*C07C 27/00* (2006.01)

(52) U.S. Cl. ........ 518/700; 518/702; 518/703; 518/704; 518/705

(58) Field of Classification Search ........... 518/700–705
See application file for complete search history.

(56) References Cited

U.S. PATENT DOCUMENTS

| 3,972,958 A | 8/1976 | Garwood et al. |
| 6,306,917 B1 | 10/2001 | Bohn et al. |
| 2003/0083391 A1* | 5/2003 | Jahnke et al. ................. 518/703 |

OTHER PUBLICATIONS

International Search Report and Written Opinion issued in connection with International Application No. PCT/IB2009/050969 on Feb. 2, 2010.
Hiller et al. "Gas Production." Ullmann's Encyclopedia of Industrial Chemistry, Dec. 15, 2006. pp. 1-31.
International Report on Patentability issued in connection with International Application No. PCT/IB2009/050969 on Jul. 23, 2010.

\* cited by examiner

*Primary Examiner* — Jafar Parsa
(74) *Attorney, Agent, or Firm* — The H.T. Than Law Group

(57) ABSTRACT

A process (200) to synthesise hydrocarbons includes gasifying (12) a carbonaceous feed material at a temperature sufficiently high to produce at least one hot synthesis gas stream (42) at a temperature of at least 900° C. and comprising at least CO and $H_2$. In a Fischer-Tropsch hydrocarbon synthesis stage (22), synthesis gas is converted to hydrocarbons, providing a tail gas stream (40) containing methane. The tail gas stream (40) is subjected to steam reforming (30) thereby converting the methane to CO and $H_2$ producing a reformed gas stream which is recycled to the Fischer-Tropsch hydrocarbon synthesis stage (22). The steam reforming (30) takes place at an elevated temperature of at least 700° C. and heat for the steam reforming is provided by indirect heat exchange with the at least one hot synthesis gas stream (42).

12 Claims, 6 Drawing Sheets

HYDROCARBON SYNTHESIS

THIS INVENTION relates to hydrocarbon synthesis. In particular, the invention relates to a process to synthesise hydrocarbons.

Fischer-Tropsch hydrocarbon synthesis provides a route for conversion of coal (or similar solid carbonaceous material) to hydrocarbons. Such Coal-to-Liquids (CTL) processes typically involve gasifying of the coal to produce a synthesis gas containing hydrogen and carbon monoxide, Fischer-Tropsch hydrocarbon synthesis using the synthesis gas to produce hydrocarbons, and work-up of the produced hydrocarbons into final products.

The composition of the synthesis gas used in the Fischer-Tropsch hydrocarbon synthesis is an important consideration. For example, where it can be assumed that equilibrium is established for the water gas shift reaction over the Fischer-Tropsch catalyst, e.g. in the case of high temperature Fischer-Tropsch hydrocarbon synthesis (typically operating between 320 and 380° C.) employing an iron-based catalyst, the synthesis gas is stoichiometrically balanced for conversion to long chain saturated hydrocarbons when the Ribblet ratio equals 1. The Ribblet ratio is given by $[H_2]/(2[CO]+3[CO_2])$, where $[H_2]$, $[CO]$ and $[CO_2]$ respectively are the molar proportions of hydrogen, carbon monoxide and carbon dioxide in the synthesis gas. In low temperature Fischer-Tropsch hydrocarbon synthesis (typically operating between 160 and 280° C.), the $[H_2]/[CO]$ ratio of the synthesis gas typically is an important parameter, with $[H_2]/[CO]$ ratio of in the range 1.5 to 2.5 typically being suitable for Fischer-Tropsch hydrocarbon synthesis.

Typically, coal derived synthesis gas is deficient in hydrogen for purposes of Fischer-Tropsch hydrocarbon synthesis. This is especially true when coal is gasified at a temperature sufficiently high to produce synthesis gas at temperatures above 900° C., the produced synthesis gas typically having a $[H_2]/[CO]$ ratio in the range of 0.3 to 1. Conventionally the short fall in hydrogen is made up by subjecting at least a portion of the gasification derived synthesis gas to water gas shift.

Appreciable amounts of methane may be produced in Fischer-Tropsch hydrocarbon synthesis, and this is especially so in hydrocarbon synthesis processes that include high temperature Fischer-Tropsch hydrocarbon synthesis. This methane can be converted back to synthesis gas via reforming, with the reformed gas then being recycled to Fischer-Tropsch hydrocarbon synthesis. As indicated above, synthesis gas derived from gasification of coal typically is deficient in hydrogen for purposes of Fischer-Tropsch hydrocarbon synthesis. As such, steam reforming typically is the most desirable technology to use for converting the methane back to synthesis gas, since it produces a synthesis gas with a high $[H_2]/[CO]$ ratio (around 3) and a high Ribblet ratio (around 1.4), i.e. it contains excess hydrogen. The excess hydrogen produced by the steam reforming of methane can then be used to adjust the $[H_2]/[CO]$ ratio or the Ribblet ratio in synthesis feed gas derived from the gasification of coal to make it suitable for Fischer-Tropsch synthesis. Steam reforming however requires that the methane (and/or other hydrocarbons) is heated in the presence of steam over a reforming catalyst to temperatures above 700° C., typically above 800° C., preferably to around 900° C. In addition, the steam reforming process is endothermic and a large amount of heat is thus required. Conventionally, this heat is provided by burning a fuel externally to a catalyst-containing volume. Conventionally, steam reforming thus requires burning a fuel source and if, as is normally the case, the fuel source contains carbon this leads to the undesirable emission of $CO_2$.

An alternative reforming technology is auto-thermal reforming, which is a combination of exothermic partial oxidation and endothermic steam reforming of methane (and/or other hydrocarbons) in one vessel (i.e. the feedstock is partially oxidised in a burner and the partially oxidised gas passed over steam reforming catalyst). Auto-thermal reforming thus requires oxygen and steam, with heat produced by the partial oxidation reaction providing the heat required for the endothermic steam reforming reactions. Compared to conventional steam reforming, auto-thermal reforming thus does not require burning of a fuel source to provide heat for the endothermic steam reforming reactions. Typically however, an auto-thermal reforming process requires an air separation unit to supply the oxygen for the reforming reaction. This is to avoid feeding a synthesis gas containing large amounts of undesirable inert nitrogen to Fischer-Tropsch hydrocarbon synthesis. In addition, the synthesis gas from an auto-thermal reaction unit is poorer in hydrogen compared to a synthesis gas obtained by reforming a methane-containing synthesis gas using steam reforming, typically having a $[H_2]/[CO]$ ratio ranging between 1.6 and 2.5 and a Ribblet ratio ranging between 0.85 and 0.95.

It would thus be advantageous if a hydrocarbon synthesis process can be provided, using synthesis gas derived from a solid carbonaceous feed material, which uses methane produced in the hydrocarbon synthesis and which combines the advantages of steam reforming and auto-thermal reforming, while simultaneously at least partly avoiding the disadvantages of these technologies.

According to the invention, there is provided a process to synthesise hydrocarbons, the process including
gasifying a carbonaceous feed material at a temperature sufficiently high to produce at least one hot synthesis gas stream at a temperature of at least 900° C. and comprising at least CO and $H_2$;
in a Fischer-Tropsch hydrocarbon synthesis stage, converting synthesis gas to hydrocarbons and providing a tail gas stream containing methane; and
subjecting the tail gas stream to steam reforming thereby converting the methane to CO and $H_2$ producing a reformed gas stream which is recycled to the Fischer-Tropsch hydrocarbon synthesis stage, the steam reforming taking place at an elevated temperature of at least 700° C. and heat for the steam reforming being provided by indirect heat exchange with said at least one hot synthesis gas stream, said at least one hot synthesis gas stream being cooled by the heat exchange so that a cooled synthesis gas stream is obtained.

The term "gasifying" in this specification is used in its conventional sense, i.e. converting a carbonaceous feedstock that is predominantly solid (e.g. coal) or liquid into synthesis gas, as opposed to "reforming" which is converting a predominantly gaseous feedstock to synthesis gas.

Typically, the carbonaceous feed material is coal.

In a preferred embodiment, the Fischer-Tropsch hydrocarbon synthesis stage employs one or more high temperature Fischer-Tropsch hydrocarbon synthesis reactors operating at temperatures between 320° C. and 380° C.

The Fischer-Tropsch hydrocarbon synthesis stage may employ one or more low temperature Fischer-Tropsch hydrocarbon synthesis reactors operating at temperatures between 160 and 280° C.

Heat may be recovered from the reformed gas stream prior to recycling thereof to the Fischer-Tropsch hydrocarbon synthesis stage. At least a portion of the heat recovered may be used to produce steam, with at least some of the steam which may then be used as steam feedstock for the steam reforming. Alternatively, or in addition, at least a portion of the heat recovered may be used to produce hot water, typically at a temperature of at least 100° C., with at least some of the hot water which may then be used for saturating the tail gas stream with water, so advantageously reducing the steam required as feedstock for the steam reforming.

The synthesis gas that is converted to hydrocarbons in the Fischer-Tropsch hydrocarbon synthesis stage may include synthesis gas from said at least one hot synthesis gas stream. Thus, in embodiments of the invention including this feature, at least a portion of the cooled synthesis gas stream is ultimately fed to the Fischer-Tropsch hydrocarbon synthesis stage. Typically, in such embodiments, heat is recovered from the cooled synthesis gas stream prior to feeding thereof to the Fischer-Tropsch hydrocarbon synthesis stage. The recovered heat may be used similarly to the heat recovered from the reformed gas stream as described hereinbefore.

One or more of said at least one hot synthesis gas streams may be generated separately from the synthesis gas that is converted to hydrocarbons in the Fischer-Tropsch hydrocarbon synthesis stage. In embodiments of the invention including this feature, at least a portion of said one or more separately generated hot synthesis gas streams, after having been used to supply heat for the steam reforming, may be used to generate power, e.g. electricity. The process may thus include a power generation stage and a power generation gasification stage, with the power generation stage and the power generation gasification stage (which produces said one or more separately generated hot synthesis gas streams) together forming an integrated gasification combined cycle process or module, also known as an IGCC process, and the process of the invention, when the carbonaceous feed material is coal, then defining a combined coal-to-liquid (CTL) and integrated gasification combined cycle process, or a combined CTL/IGCC process. The power generation gasification stage preferably gasifies the carbonaceous feedstock using an oxygen feedstock having a purity below 98%, more preferably below 90%. Advantageously, non-cryogenic separation techniques, e.g. membranes or absorbents, may be employed to produce oxygen at purities below 90%. Most preferably the power generation gasification stage employs an air-blown gasifier in preference to an oxygen-blown gasifier. Advantageously, said one or more separately generated hot synthesis gas streams produced in the power generation gasification stage will in such cases be diluted with nitrogen, providing a less aggressive environment for steam reforming equipment and heat recovery equipment in which to operate. In addition, the use of an air-blown gasifier or oxygen feedstock of lesser purity will reduce the required air separation duty for the production of oxygen.

At least a portion of the synthesis gas that is converted to hydrocarbons in the Fischer-Tropsch hydrocarbon synthesis stage may be generated by gasification of carbonaceous feed material in a gasifier producing synthesis gas with an exit temperature of less than 900° C., e.g. a Sasol-Lurgi dry bottom fixed bed gasifier. Typically the carbonaceous feed material is coal.

Typically the synthesis gas that is derived from gasification and that is converted to hydrocarbons in the Fischer-Tropsch hydrocarbon synthesis stage is generated using an oxygen feedstock having a purity above 98%. Typically such oxygen feedstock is produced in an air separation unit, and typically the air separation unit is a cryogenic separation unit.

The reformed gas stream may be combined with the hot synthesis gas stream immediately after steam reforming, with a resultant combined gas stream being used to heat the tail gas stream for reforming purposes, providing a combined cooled synthesis gas stream for ultimate conversion in the Fischer-Tropsch hydrocarbon synthesis stage to hydrocarbons. The reformed gas stream and the hot synthesis gas stream may be combined inside a steam reformer vessel in which the steam reforming takes place. Advantageously, for a process in accordance with the invention which employs a steam reformer with a vessel holding catalyst-containing reformer tubes, such a process embodiment eliminates the need for a tube sheet at one end of the reformer tubes and may allow cheaper materials of construction to be used for the steam reformer and/or for heat recovery equipment, as the pressure difference between the inside and the outside of the reformer tubes can be kept low.

It may however be preferable to keep the reformed gas stream and the cooled synthesis gas stream separate, even when they are both being fed to the Fischer-Tropsch hydrocarbon synthesis stage, typically at least until no further process steps are required to be performed on the cooled synthesis gas stream before the cooled synthesis gas stream is ultimately fed to the Fischer-Tropsch hydrocarbon synthesis stage. In this regard, it is to be appreciated that the cooled synthesis gas stream will invariably include sulphur species when the synthesis gas is obtained from coal gasification. These sulphur species typically are removed to levels that can be tolerated for Fischer-Tropsch hydrocarbon synthesis before the cooled synthesis gas stream is used for Fischer-Tropsch hydrocarbon synthesis. In contrast, the reformed gas stream will typically have a sulphur content already below that which can be tolerated for Fischer-Tropsch hydrocarbon synthesis. Naturally, when at least a portion of said one or more separately generated hot synthesis gas streams is used to generate power subsequent to having been used to supply heat for the steam reforming, the resultant cooled synthesis gas stream is preferably kept separate from the reformed gas stream which is recycled to the Fischer-Tropsch hydrocarbon synthesis stage.

The process typically includes treating the methane-containing tail gas stream from the Fischer-Tropsch hydrocarbon synthesis stage before the tail gas stream is subjected to steam reforming.

The treatment of the methane-containing tail gas stream typically includes cooling of the tail gas stream to condense reaction water and hydrocarbon products and separating the condensed reaction water and the condensed hydrocarbon products from the tail gas.

The treatment of the methane-containing tail gas stream may also include removing $CO_2$ from the tail gas. This may be effected in conventional fashion, e.g. using a Benfield solution.

Treatment of the methane-containing tail gas stream may also include subjecting the tail gas to a low temperature separation stage in which light hydrocarbons such as ethane and ethylene and other light olefins and paraffins are separated from the tail gas. This may be effected using conventional technology such as distillation and/or absorption. Subjecting the methane-containing tail gas to a low temperature separation stage may include producing a stream containing hydrogen and/or carbon monoxide which may be recycled to the Fischer-Tropsch hydrocarbon synthesis stage. Typically a low temperature separation stage operates at temperatures down to about −150° C.

If desired however, the process may omit subjecting the methane-containing tail gas to a low temperature separation stage, with the light hydrocarbons in the tail gas thus being reformed with the methane in the steam reformer for recycle of carbon monoxide and hydrogen to the Fischer-Tropsch hydrocarbon synthesis stage. In such a case however, a portion of the tail gas from the Fischer-Tropsch hydrocarbon synthesis stage is purged to remove argon, nitrogen and trace inerts from the process.

The invention will now be described, by way of example, with reference to the accompanying diagrammatic drawings in which FIG. 1 shows one embodiment of a conventional process to synthesise hydrocarbons using fine coal as carbonaceous feed material;

Figure 5:
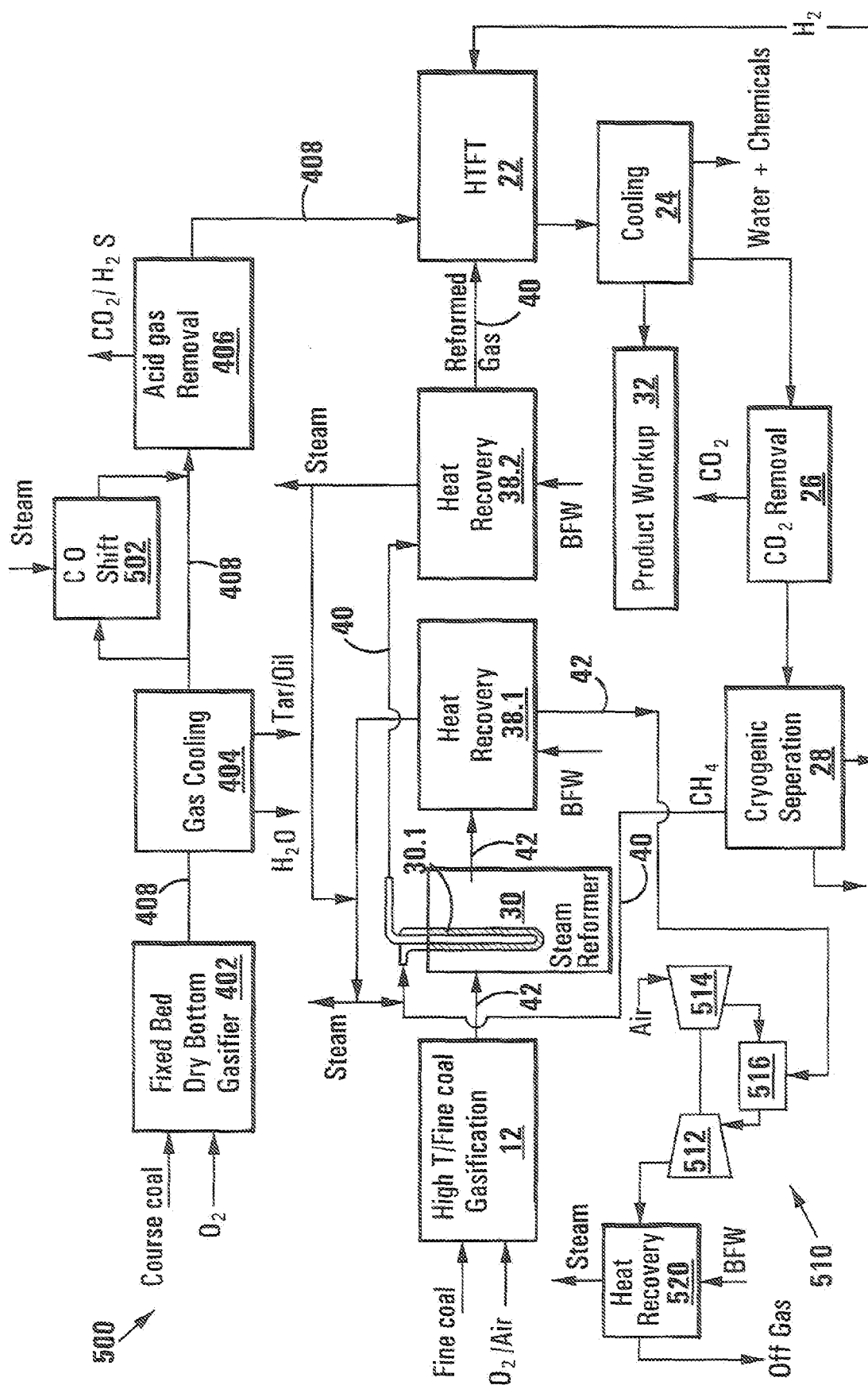
Figure 6:
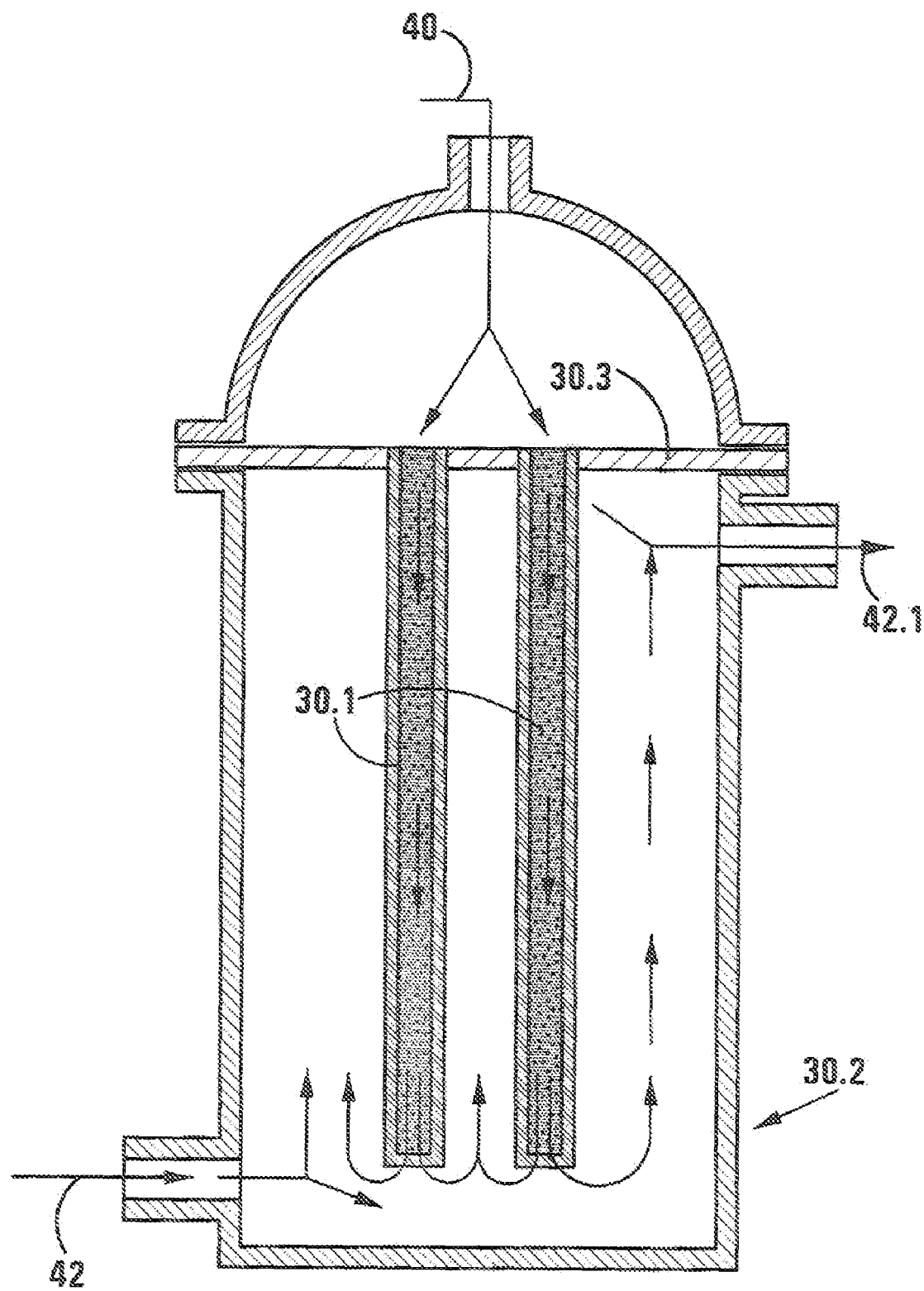

FIG. 5 shows yet another embodiment of a process in accordance with the invention to synthesise hydrocarbons using both coarse and fine coal as carbonaceous feed material, employing an integrated gasification combined cycle to generate electrical power; and FIG. 6 shows a vertically sectioned view of a reformer which can be employed in an embodiment of the invention in which reformed gas is combined with synthesis gas after steam reforming.

Figure 1:
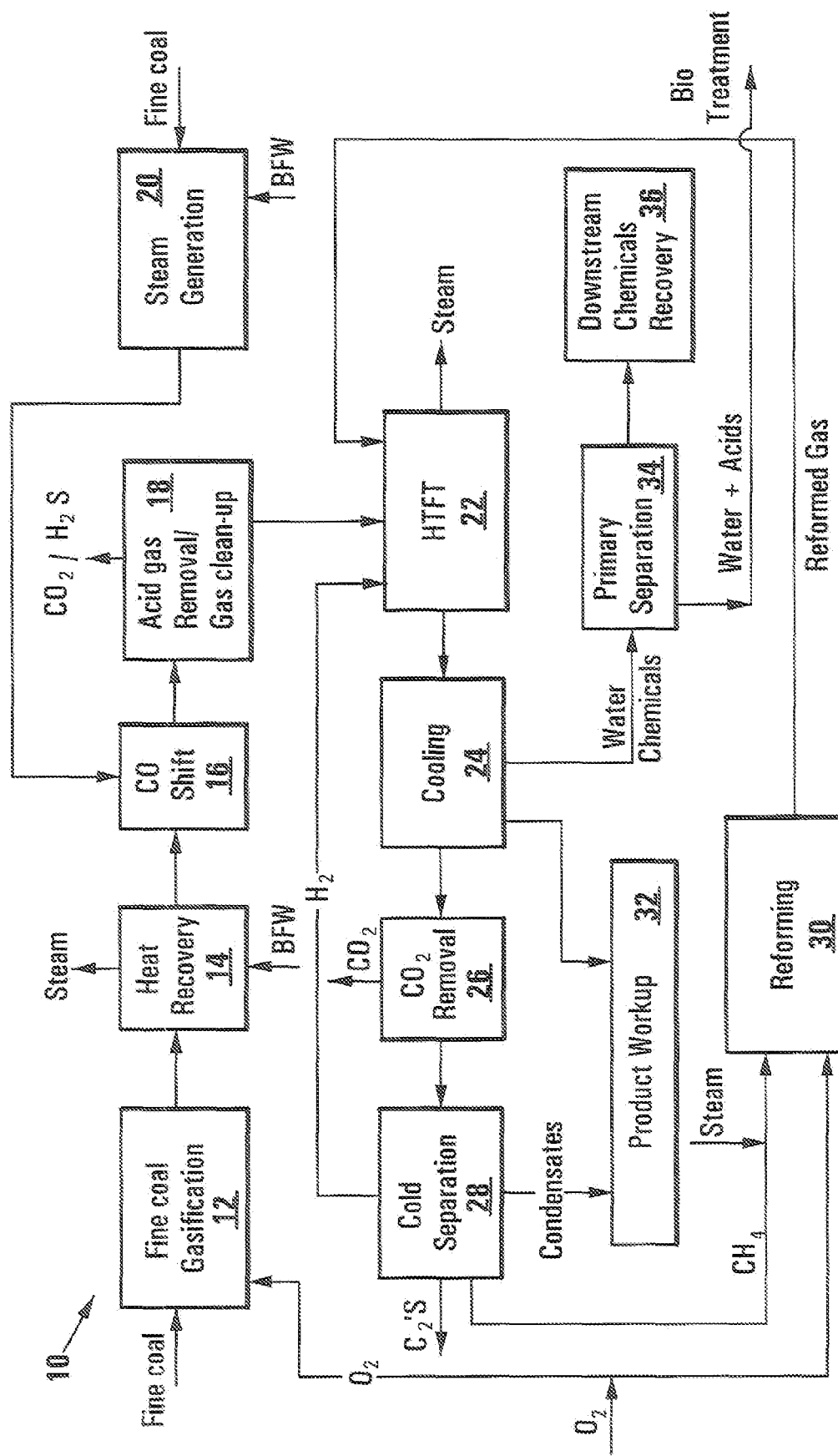

Referring to FIG. 1 of the drawings, reference numeral 10 generally indicates a conventional process to synthesise hydrocarbons using fine coal as a carbonaceous feed material. The process 10 includes, broadly, a coal gasification stage 12, a heat recovery stage 14, a water gas shift stage 16, a gas sweetening and clean-up stage 18, a steam generation stage 20 and a high temperature Fischer-Tropsch hydrocarbon synthesis stage 22. The process 10 further includes a gas cooling stage 24, a $CO_2$ removal stage 26, a low temperature or cold separation stage 28, a reforming stage 30, a product work-up stage 32, a reaction water primary separation stage 34 and a downstream chemicals recovery stage 36.

In conventional coal-to-liquids (CTL) flow schemes, such as the process 10, coal is gasified to produce a mixture of gas containing $H_2$ and CO, referred to as synthesis gas. Depending on the coal quality, different gasification technologies can be used. Coal smaller than 5 mm, i.e. fine coal, is not suitable for the well-proven and commercially successful Sasol-Lurgi dry bottom fixed bed gasification process. This fine coal can however be gasified by a group of technologies that can collectively be called high temperature gasification, in which the exit gas from the gasifiers has a temperature in excess of 900° C. The conventional process 10 shown in FIG. 1 can use coal smaller than 5 mm as a carbonaceous feedstock and the coal gasification stage 12 thus employs high temperature gasifiers.

Fine coal is thus gasified in the coal gasification stage 12 producing a raw synthesis gas stream at a temperature typically between about 1,000° C. and 1,500° C. which is fed to the heat recovery stage 14. The gasification stage 12 uses oxygen and not air. Boiler feed water (BFW) is fed to the heat recovery stage 14 and high pressure steam (typically 40 bar (g)) is produced typically at a temperature of between about 250° C. and 500° C. The raw synthesis gas is cooled to a temperature of about 300° C. in the heat recovery stage 14 and fed to the water gas shift (CO shift) stage 16 to adjust the ratio of $H_2$ to CO. In the steam generation stage 20, steam is generated using fine coal as a fuel and the steam is also fed as feedstock to the water gas shift stage 16, The raw synthesis gas is thus subjected to the well-known water gas shift reaction to convert CO and water (steam) to $CO_2$ and $H_2$, in the water gas shift stage 16. The raw synthesis gas, now with an increased concentration of $CO_2$ and $H_2$, and at a temperature of about 500° C., is fed to the gas sweetening and clean-up stage 18. In the gas sweetening and clean-up stage 18, the raw synthesis gas is cleaned in conventional fashion to remove sulphur, particulate material and $CO_2$. Conventional synthesis gas cleaning technology may be used, e.g. a Rectisol (trade name) process, amine washes and an absorption process employing a Benfield solution.

The clean synthesis gas is fed to the high temperature Fischer-Tropsch hydrocarbon synthesis stage 22. Conventional high temperature Fischer-Tropsch hydrocarbon synthesis is used in the stage 22 producing a product gas stream which includes gaseous hydrocarbon products, including methane, and reaction water, in the form of vapour. The high temperature Fischer-Tropsch hydrocarbon synthesis stage 22 employs one or more synthesis reactors operating at a temperature between 320° C. and 380° C. and an operating pressure in the range 10 to 50 bar(g). Such a high temperature Fischer-Tropsch hydrocarbon synthesis stage is a low chain growth reaction stage, which typically employs one or more fluidised bed synthesis reactors which cannot produce a continuous liquid product phase, but only a product gas stream. Typically, this product gas stream has a temperature of between about 320° C. and 380° C., e.g. about 350° C. Cooling of the exothermic hydrocarbon synthesis process also produces steam.

In the gas cooling stage 24 the product gas is cooled, condensing reaction water which is withdrawn as a reaction water product stream which comprises water and chemicals. The reaction water product stream is passed to the reaction water primary separation stage 34 where it is separated into a water and acid stream which is sent for bio-treatment, and a product stream which is sent to the downstream chemicals recovery stage 36 for recovery of desirable products.

The gas cooling stage 24 also produces a hydrocarbon condensate stream which is sent to the product work-up stage 32 for product work-up in conventional fashion. A tail gas stream from the gas cooling stage 24, typically at a temperature slightly above ambient or atmospheric temperature (e.g. between about 30° C. and 40° C.), is subjected to $CO_2$ removal in the $CO_2$ removal stage 26, again using conventional technology, such as a Benfield solution. The tail gas stream is then cooled in the cold separation stage 28 in order to recover light hydrocarbons such as propylene, in the form of condensates. The cold separation stage 28 operates at a temperature of down to $-150°$ C., to allow for separation of hydrogen and methane. The condensates are passed to the product work-up stage 32 for working up. The cold separation stage 28 also produces a valuable $C_2$-rich stream which is removed, as well as an $H_2$ stream which is typically recycled to the high temperature Fischer-Tropsch hydrocarbon synthesis stage 22. The tail gas stream from the cold separation stage 28 still contains methane and this tail gas stream is subjected to reforming in the reforming stage 30. The reforming stage 30 can make use of steam reforming which requires the burning of a fuel, or a combination of steam reforming and autothermal reforming which also requires the burning of a fuel. In any event, as with the coal gasification stage 12, fuel and some form of oxygen (e.g. air) is thus required for the reforming stage 30.

In the reforming stage 30, the methane in the tail gas is converted to CO and $H_2$, producing a reformed gas stream which is recycled to the high temperature Fischer-Tropsch hydrocarbon synthesis stage 22. Typically, the reformed gas stream is at a temperature of between about 950° C. and 1,050° C., depending on the reforming technology used. Although not shown in FIG. 1, heat may be recovered from the reformed gas stream before it is fed to the synthesis stage 22.

A disadvantage of the process 10 is that it either requires the burning of a fuel in the reforming stage 30, which typically leads to undesirable $CO_2$ emissions, and/or high purity oxygen which means that air separation capacity is required to supply the required high purity oxygen. Furthermore, when the reforming stage 30 employs auto-thermal reforming, the reformed gas stream from the reforming stage 30 is poorer in hydrogen compared to when steam reforming is used. This is a disadvantage, bearing in mind the hydrogen needs of the high temperature Fischer-Tropsch hydrocarbon synthesis stage 22.

Figure 2:
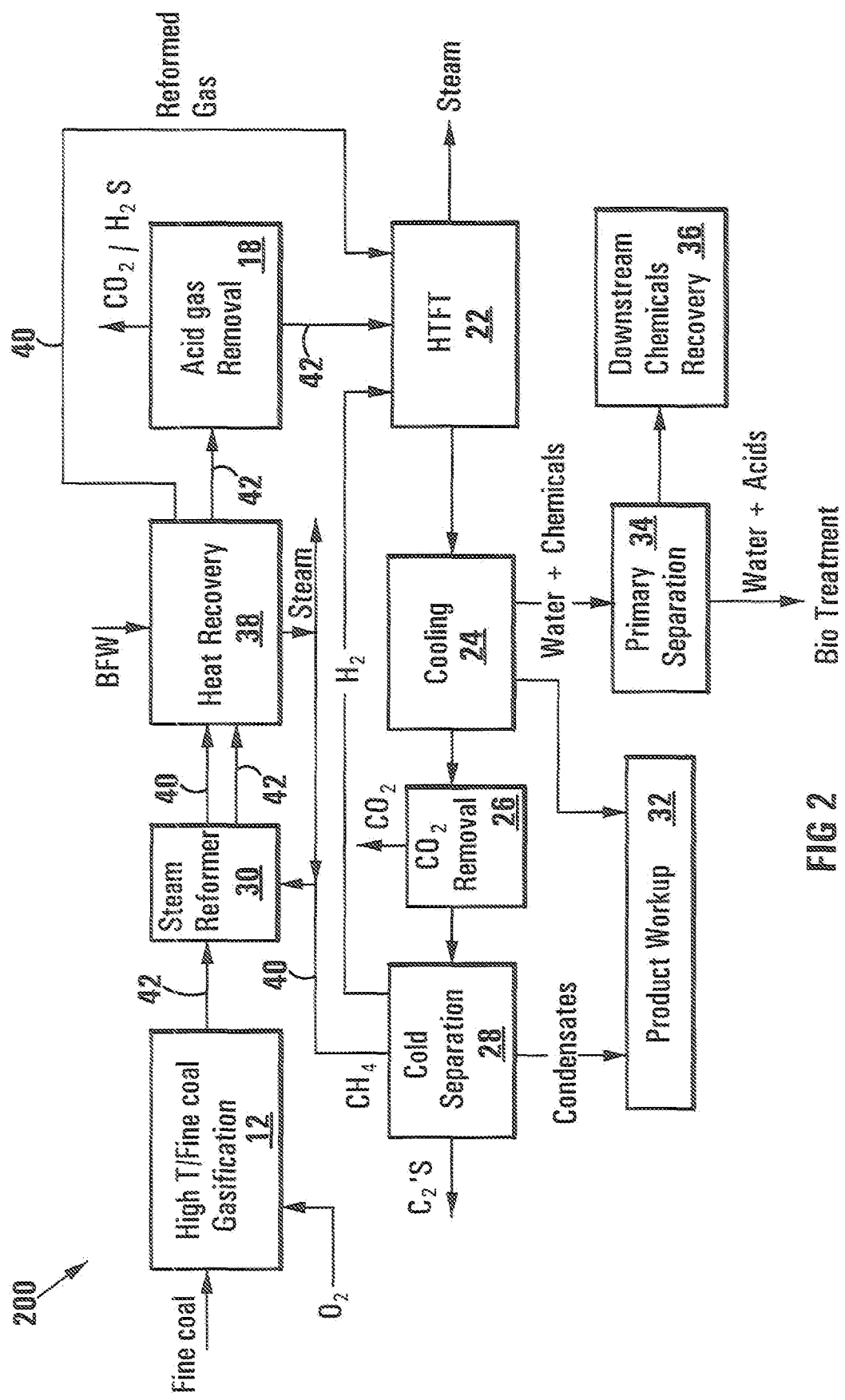
FIG. 2 shows one embodiment of a process in accordance with the invention to synthesise hydrocarbons using fine coal as carbonaceous feed material.

Referring now to FIG. 2 of the drawings, reference numeral 200 generally indicates a process in accordance with the invention to synthesise hydrocarbons, using fine coal as carbonaceous feed material. The process 200 is in many respects the same as or similar to the process 10 and the same or similar process features are thus indicated by the same reference numerals used in FIG. 1, unless otherwise indicated.

In the process 200, the reforming stage 30 is a steam reforming stage. The reforming stage 30 and a heat recovery stage 38 are located between the coal gasification stage 12 and the gas sweetening and clean-up stage 18. The raw synthesis gas in the process 200, having been produced in a high temperature or fine coal gasifier, is at a temperature of at least 900° C. This hot raw synthesis gas stream passes through the reforming stage 30 in indirect heat exchange relationship with the methane-rich tail gas stream from the cold separation stage 28. Steam from the heat recovery stage 38 is also fed to the reforming stage 30 where the methane in the methane-rich tail gas stream is thus reformed by way of steam reforming to convert the methane to CO and $H_2$, producing a reformed gas stream which is passed through the heat recovery stage 38 and recycled to the high temperature Fischer-Tropsch hydrocarbon synthesis stage 22, as indicated by the flowlines 40. As will be appreciated, with the raw synthesis gas stream from the coal gasification stage 12 being at a temperature of at least 900° C., and taking into account the heating duty of the reforming stage 30, it is possible to operate the reforming stage 30 at a temperature of at least 700° C. with all the energy required for the steam reforming being provided by indirect heat exchange with the raw synthesis gas stream at a temperature of at least 900° C. The raw synthesis gas stream from the reforming stage 30, although already somewhat cooled, is passed through the heat recovery stage 38 for the production of steam and then fed to the gas sweetening and clean-up stage 18, as indicated by the flowlines 42.

Advantageously, the reformed gas stream recycled to the high temperature Fischer-Tropsch hydrocarbon synthesis stage 22 by means of the flowline 40 has a high Ribblet ratio, i.e. a high ratio of $H_2$:CO. Typically, this ratio will be around 1.4 which is in contrast to the synthesis gas stream being fed to the high temperature Fischer-Tropsch hydrocarbon synthesis stage 22 in the flowline 42, which has a low Ribblet ratio. The excess hydrogen in the reformed gas stream can thus be used to adjust the $H_2$:CO ratio of the coal-derived synthesis gas in the flowline 42, making it more suitable for Fischer-Tropsch synthesis. Advantageously, the process 200 thus does not require a water gas shift stage (CO shift stage) like the water gas shift stage 16 of the conventional process 10.

It is an advantage of the process 200, as illustrated, that it does not require additional air separation capacity for purposes of reforming of the tail gas stream. It is a further advantage of the process 200, as illustrated, that it does not require the burning of extra fuel to supply the energy for the steam reforming, thus reducing $CO_2$ emissions and allowing all of the hydrocarbon feed to the reforming stage 30 to be converted into usable synthesis gas. This allows the process 200 to be designed more energy- and carbon-efficient than the process 10, with less carbon dioxide emissions for the same production level. This is at least partly due to the fact that the heat available at high temperature in the hot raw synthesis gas stream is used to supply the heat at high temperature required for the steam reforming of the tail gas. The cost of the gasification unit is a very large part of the overall capital cost of a coal-to-liquids plant. By increasing the efficiency of the gasification stage to produce more synthesis gas by employing the heat from the high temperature gasification of coal in steam reforming, a coal-to-liquids plant becomes economical at a smaller scale allowing the technology to be used in more locations.

Figure 3:
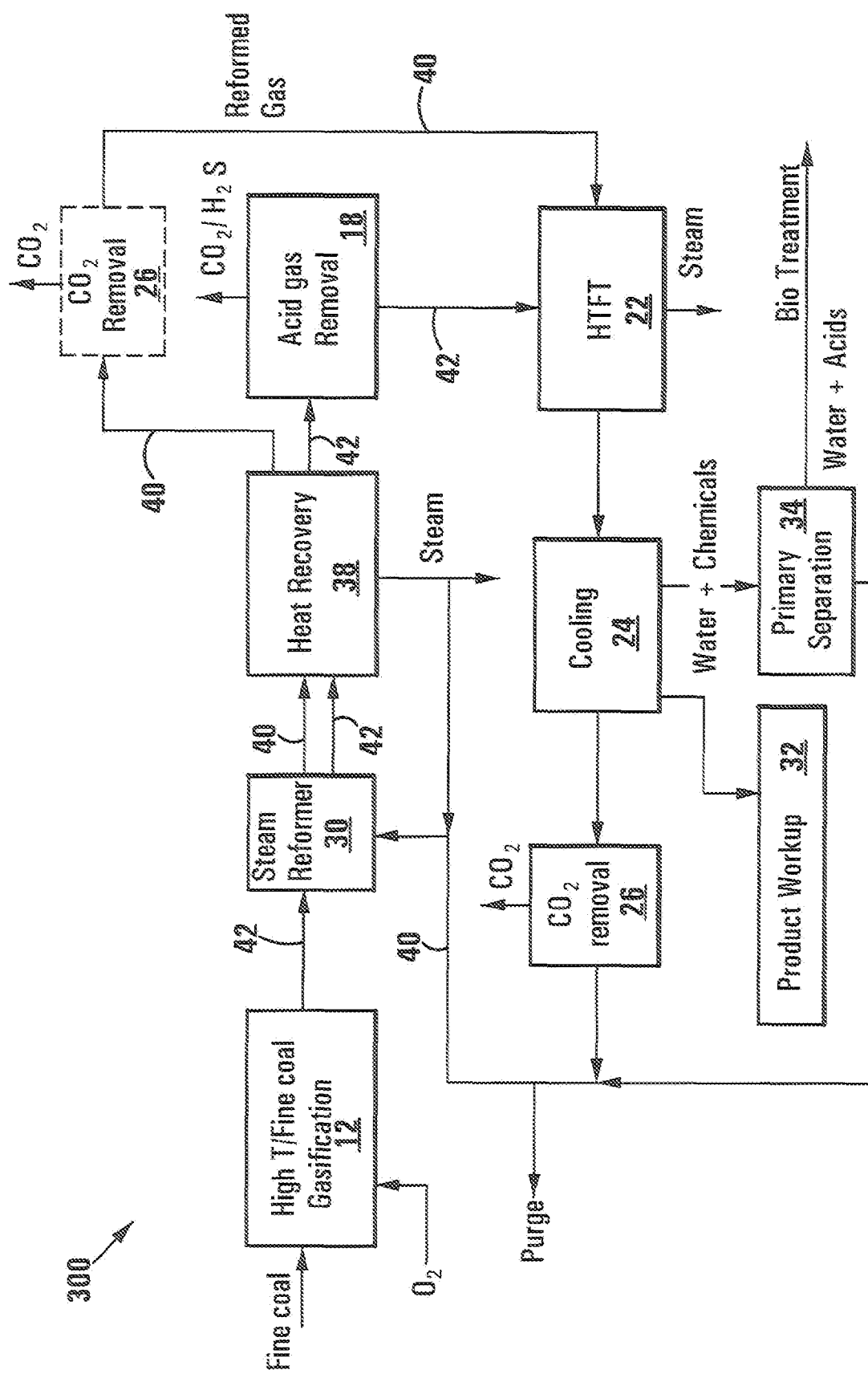
FIG. 3 shows another embodiment of a process in accordance with the invention to synthesise hydrocarbons using fine coal as carbonaceous feed material.

FIG. 3 illustrates a further embodiment of a process in accordance with the invention to synthesise hydrocarbons using fine coal as carbonaceous feed material. The process is generally indicated by reference numeral 300 and requires fewer facilities which should make the capital requirements for a plant using the process 300 smaller, compared for example to the process 200.

As will be noticed, the process 300 does not include a low temperature or cold separation stage 28 nor does it include a downstream chemicals recovery stage 36. Instead, the hydrocarbon chemicals separated from the water and acids in the reaction water primary separation stage 34 are recycled to the steam reforming stage 30, together with most of the hydrocarbons that would otherwise have been separated and recovered in the cold separation stage. These hydrocarbons are reformed in the reforming stage 30 with minimal loss of the carbon and hydrogen constituents. A small part of the methane-rich tail gas stream is purged to remove argon, nitrogen and trace inerts from the process 300.

In the reforming stage 30, all of the hydrocarbons are destroyed during the steam reforming process so that the reformed gas stream in the flowline 40 to the high temperature Fischer-Tropsch hydrocarbon synthesis stage 22 comprises essentially only $CO_2$, $H_2$, $O_2$ and CO. If the $CO_2$ removal stage 26 employs a Benfield solution, it may be advantageous for the $CO_2$ removal stage 26 to be located between the heat recovery stage 38 and the high temperature Fischer-Tropsch hydrocarbon synthesis stage 22, as shown in broken lines in FIG. 3, bearing in mind that the reformed gas stream will be essentially free of hydrocarbons which, when present, may negatively affect a Benfield solution. The process 300 will then typically not have the $CO_2$ removal stage 26 after the gas cooling stage 24.

Much of the value of a high temperature Fischer-Tropsch hydrocarbon synthesis process lies in the co-products that are produced, namely ethane and ethylene and other light olefins and chemical by-products. However, the cost of the required cold separation unit and downstream chemicals recovery units is large. This reduces the attractiveness of high temperature Fischer-Tropsch hydrocarbon synthesis for remote locations, bearing in mind that the co-products must still be transported from the remote plant location to suitable markets. Also, the recovery of co-products generally dictates that facilities need to be large in order to be economical. However, in the process 300, as illustrated, a large portion of the hydrocarbons that would otherwise be separated and recovered in the cold separation unit or the downstream chemicals recovery unit can be reformed, thus maintaining the carbon and hydrogen efficiency without requiring a cold separation stage or a downstream chemicals recovery stage, making the process 200 more economical, and thus more attractive, at a smaller scale.

Figure 4:
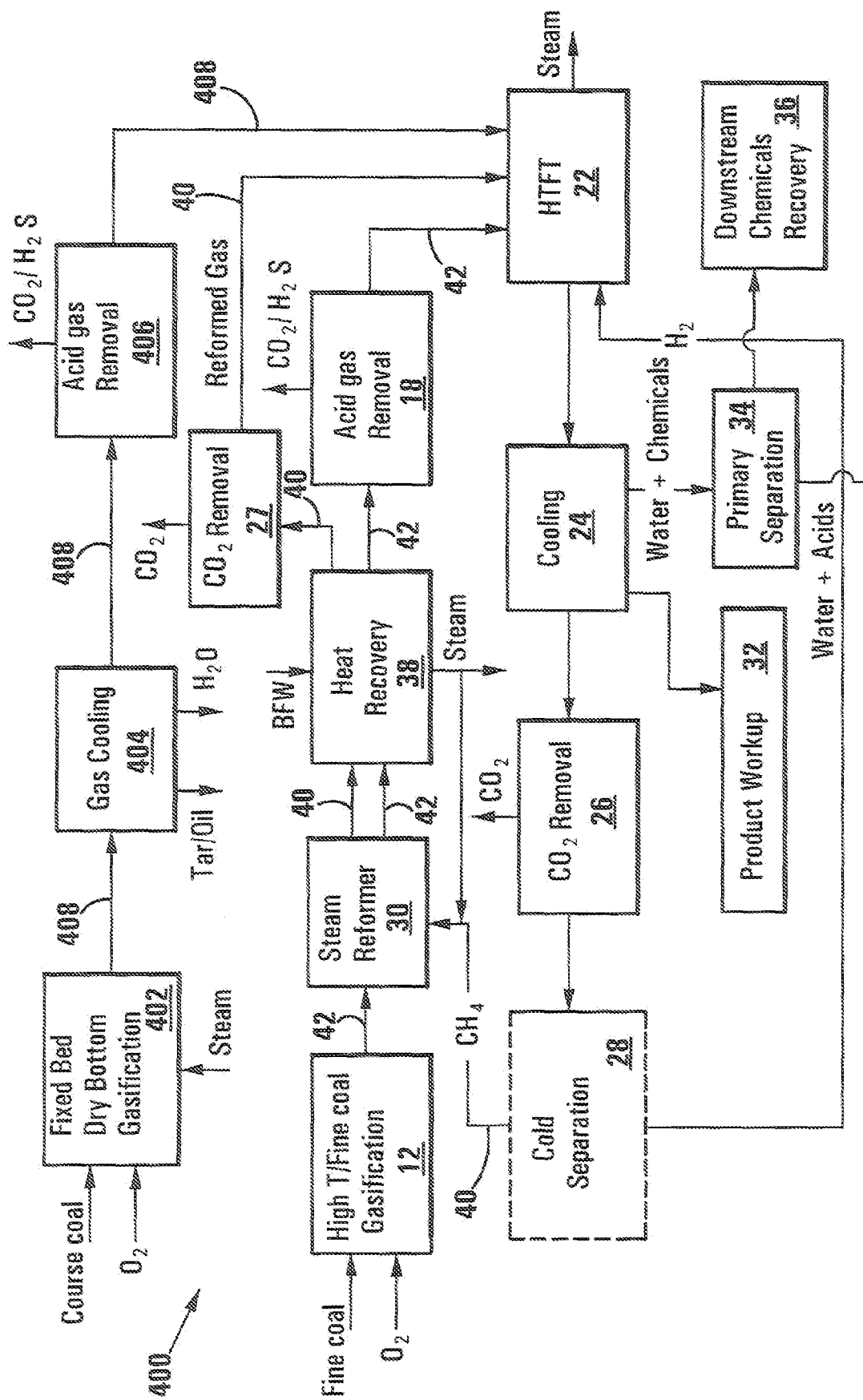
FIG. 4 shows a further embodiment of a process in accordance with the invention to synthesise hydrocarbons using both coarse and fine coal as carbonaceous feed material.

FIG. 4 illustrates a further embodiment of a process in accordance with the invention to synthesise hydrocarbons using both coarse and fine coal as carbonaceous feed material. The process is generally indicated by reference numeral 400. The same process features are indicated using the same reference numerals as were used in FIGS. 1 to 3, unless otherwise indicated.

A distinct feature of the process 400 is that it includes a further coal gasification stage 402, a further gas cooling stage 404 and a further gas sweetening and clean-up stage 406.

The coal gasification stage 402 is a fixed bed dry bottom gasification stage, unlike the coal gasification stage 12 which is a high temperature gasification stage. The coal gasification stage 402 uses coarse coal, i.e. coal having particles larger than 5 mm as carbonaceous feedstock material and gasifies the coarse coal in the presence of oxygen and steam. The coal gasification stage 402 produces a synthesis gas stream which is also fed to the high temperature Fischer-Tropsch hydrocarbon synthesis stage 22 as indicated by the flowlines 408. The synthesis gas in the flowlines 408 is first cooled in the gas cooling stage 404 which operates in similar fashion to the gas cooling stage 24, and then sweetened and cleaned in the gas sweetening and clean-up stage 406, which operates in similar fashion to the gas sweetening and clean-up stage 18. The stages 406 and 18 advantageously may be combined by feeding the synthesis gas in the flowlines 408 and 42 to different locations in such a combined unit, thereby potentially saving capital and energy.

In the process 400, synthesis gas from the coal gasification stage 12 and synthesis gas from the coal gasification stage 402 are ultimately fed to the high temperature Fischer-Tropsch hydrocarbon synthesis stage 22. The process 400 thus allows the use of coarse coal for the generation of synthesis gas, in addition to the use of fine coal for the generation of synthesis gas, whilst retaining all of the advantages of the process 200. In the process 400, the cold separation stage 28 may also be omitted, and possibly also the downstream chemicals recovery stage 36 so that the process 400 may in these respects be similar to the process 300.

The fixed bed dry bottom gasification stage 402 of the process 400 produces a synthesis gas with a higher concentration of methane than the high temperature fine coal gasification stage 12. This methane passes through the high temperature Fischer-Tropsch hydrocarbon synthesis stage 22 and is then advantageously reformed in the steam reformer 30, using the energy in the synthesis gas from the high temperature fine coal gasification stage 12, before being recycled as CO and $H_2$ to the synthesis stage 22.

In the process 400, a $CO_2$ removal stage 27 in the flowline 40 may not be required and in some embodiments of the invention, the $CO_2$ removal stage 27 in the flowline 40 may thus be omitted. The cold separation stage 28 is also optional. The $CO_2$ removal stage 26 after the gas cooling stage 24 typically employs a Benfield solution.

FIG. 5 shows yet another embodiment of a process in accordance with the invention to synthesise hydrocarbons using both coarse and fine coal as carbonaceous feed material. The process is generally indicated by the reference numeral 500 and employs an integrated gasification combined cycle to generate electrical power. The process 500 shows similarities with the process 400 and the same reference numerals that were used in FIG. 4 are thus also used in FIG. 5 to indicate the same or similar process features.

The process 500 includes a water gas shift stage 502 operable to treat a slipstream portion of the synthesis gas in the flowlines 408 to shift some of the CO in the synthesis gas to $CO_2$, producing $H_2$ and thereby altering the $[H_2]/[CO]$ ratio in the synthesis gas in the flowlines 408 leading to the high temperature Fischer-Tropsch hydrocarbon synthesis stage 22. The water gas shift stage 502 may be entirely conventional.

In FIG. 5, the heat recovery stage 38 is shown as comprising two heat recovery modules 38.1 and 38.2. The Applicant expects this to be a typical arrangement for the heat recovery stage 38 with both of the facilities 38.1 and 38.2 generating steam from boiler feed water.

FIG. 5 also shows a more accurate depiction of a typical reformer that would be used in the reforming stage 30. It is expected that the reformer used in the reforming stage 30 will be of a bayonet tube heat exchange reactor type, similar to that described and referred to in European Patent Application No. 535505. Such reformers contain a number of bayonet type reformer tubes 30.1 (only one of which is shown in FIG. 5). The methane containing gas being reformed is on the inside of the bayonet type reformer tubes 30.1 with the hot synthesis gas, initially at a temperature of at least 900° C., being on the outside of the bayonet type reformer tubes 30.1. The steam reforming catalyst is thus also on the inside of the bayonet type reformer tubes 30.1 and the reformed gas is withdrawn through a centre tube.

Unlike the processes 200, 300 and 400, the synthesis gas from the high temperature coal gasification stage 12 in the process 500 is not routed to the high temperature Fischer-Tropsch hydrocarbon synthesis stage 22. Instead, the synthesis gas, flowing along the flowlines 42, is routed to an integrated gasification combined cycle (IGCC) facility generally indicated by reference numeral 510.

The IGCC facility 510 includes an expansion turbine 512 drivingly connected to an air compressor 514. A combustor 516 is provided upstream of the expansion turbine 512 and a heat recovery steam generation stage 520 is provided downstream of the expansion turbine 512.

As indicated in FIG. 5, the coal gasification stage 12 has the option of using air instead of oxygen. This is possible because the synthesis gas produced by the coal gasification stage 12 is not passed to the high temperature Fischer-Tropsch hydrocarbon synthesis stage 22, where nitrogen in the feed negatively impacts on yield. Instead, as hereinbefore indicated, the synthesis gas from the coal gasification stage 12 is passed to the IGCC facility 510 where it is combusted in the combustor 516. The combustor 516 is provided with compressed air from the air compressor 514, which is driven by the expansion turbine 512. Hot combusted gas from the combustor 516 is thus passed to the expansion turbine 512 producing hot off gas which passes through the heat recovery and steam generation stage 520 where heat is recovered, producing steam from boiler feed water.

Operating the coal gasification stage 12 with air instead of oxygen has the further advantage, in addition to not requiring additional air separation capacity, that the synthesis gas produced in the coal gasification stage 12 is diluted with nitrogen which provides a less aggressive environment for the high temperature heat exchange effected in the steam reformer 30 and the heat recovery stage 38. Less expensive materials of construction and less expensive construction methods may thus be employed in the steam reforming stage 30 and in the heat recovery stage 38.

If desirable, the cold separation stage 28 may be omitted from the process 500, as was discussed for the process 300 and the process 400.

If it is not necessary or desirable to keep the reformed gas stream 40 and the raw, cooled synthesis gas stream 42 from the reforming stage 30 separate, a reformer 30.2 as illustrated schematically in FIG. 6 may be employed. In the reformer 30.2, the catalyst filled reformer tubes 30.1 (only two of which are shown) are open at lower ends thereof, the catalyst filled interiors of the tubes 30.1 thus being in flow communication with one another and with a shell side volume of the reformer 30.2. A suitable retainer is however provided for each reformer tube 30.1 to keep the catalyst in the tube. Upper ends of the reformer tubes 30.1 are held in a tube sheet 30.3. In use, a mixture of steam and the methane-containing tail gas stream enters the reformer 30.2 and passes through the reformer tubes 30.1 as indicated by flowline 40. In the reformer tubes 30.1, the methane is catalytically steam reformed and the reformed gas from the reformer tubes 30.1 leaves the reformer tubes 30.1 at their open lower ends, where the reformed gas mixes with hot raw synthesis gas 42 (at a temperature of at least 900° C.) from the gasification stage 12. This mixture then passes counter current to the gas being reformed, upwardly through the shell side volume of the reformer 30.2, to heat the gas being reformed inside the reformer tubes 30.1 in indirect heat exchange fashion to a temperature of at least 700° C. and leaves the reformer 30.2 as a cooled gas stream as indicated by a flow line 42.1 for further heat recovery, acid gas removal and ultimately Fischer-Tropsch hydrocarbon synthesis.

In all of the processes 200, 300, 400 and 500, steam reforming is advantageously used to convert methane in tail gas from a high temperature Fischer-Tropsch hydrocarbon synthesis stage to CO and $H_2$. Advantageously, this is done without burning a fuel for purposes of providing heat to the steam reformer and thus without increasing $CO_2$ emissions from the process. The processes 200, 300, 400 and 500, as illustrated, avoid using an auto-thermal reformer for reforming the methane in the tail gas from the high temperature Fischer-Tropsch hydrocarbon synthesis stage, thus reducing air separation capacity requirements and providing a reformed gas stream which is richer in hydrogen and which can be recycled to the high temperature Fischer-Tropsch hydrocarbon synthesis stage.

The invention claimed is:

1. A process to synthesise hydrocarbons, the process including
   gasifying fine coal at a temperature sufficiently high to produce at least one hot synthesis gas stream at an exit temperature of at least 900° C. and comprising at least CO and $H_2$, the CO and $H_2$ being present in a $[H_2]/[CO]$ molar ratio in the range 0.3 to 1;
   in a Fischer-Tropsch hydrocarbon synthesis stage, converting synthesis gas to hydrocarbons and providing a tail gas stream containing methane; and
   subjecting the tail gas stream to steam reforming thereby converting the methane to CO and $H_2$ producing a reformed gas stream which is recycled to the Fischer-Tropsch hydrocarbon synthesis stage, the steam reforming taking place at an elevated temperature of at least 700° C. and heat for the steam reforming being provided by indirect heat exchange with said at least one hot synthesis gas stream, said at least one hot synthesis gas stream being cooled by the heat exchange so that a cooled synthesis gas stream is obtained.

2. The process as claimed in claim 1, in which the Fischer-Tropsch hydrocarbon synthesis stage employs one or more high temperature Fischer-Tropsch hydrocarbon synthesis reactors operating at temperatures between 320° C. and 380° C.

3. The process as claimed in claim 1, in which heat is recovered from the reformed gas stream prior to recycling thereof to the Fischer-Tropsch hydrocarbon synthesis stage, at least a portion of the heat recovered being used to produce steam, with at least some of the steam produced being used as steam feedstock for the steam reforming.

4. The process as claimed in claim 1, in which heat is recovered from the reformed gas stream prior to recycling thereof to the Fischer-Tropsch hydrocarbon synthesis stage, at least a portion of the heat being used to produce hot water at a temperature higher than 100° C., with at least some of the hot water being used for saturating the tail gas stream with water, thereby reducing the steam required as feedstock for the steam reforming.

5. The process as claimed in claim 1, in which the synthesis gas that is converted to hydrocarbons in the Fischer-Tropsch hydrocarbon synthesis stage includes synthesis gas from said at least one hot synthesis gas stream, so that at least a portion of the cooled synthesis gas stream is ultimately fed to the Fischer-Tropsch hydrocarbon synthesis stage.

6. The process as claimed in claim 1, in which one or more of said at least one hot synthesis gas streams are generated in a separate gasifier from the synthesis gas that is converted to hydrocarbons in the Fischer-Tropsch hydrocarbon synthesis stage, at least a portion of said one or more separately generated hot synthesis gas streams, after having been used to supply heat for the steam reforming, being used to generate power.

7. The process as claimed in claim 6, which includes a power generation stage and a power generation gasification stage, with the power generation stage and the power generation gasification stage (which produces said one or more separately generated hot synthesis gas streams) together forming an integrated gasification combined cycle process or module.

8. The process as claimed in claim 7, in which the power generation gasification stage gasifies the fine coal using an oxygen feedstock produced by a non-cryogenic separation technique, or in which the power generation gasification stage gasifies the fine coal using an oxygen feedstock which is air.

9. The process as claimed in claim 1, in which at least a portion of the synthesis gas that is converted to hydrocarbons in the Fischer-Tropsch hydrocarbon synthesis stage is generated by gasification of carbonaceous feed material in a gasifier producing synthesis gas with an exit temperature of less than 900° C.

10. The process as claimed in claim 1, in which the reformed gas stream is combined with the hot synthesis gas stream immediately after steam reforming, with a resultant combined gas stream being used to heat the tail gas stream for reforming purposes, providing a combined cooled synthesis gas stream for ultimate conversion in the Fischer-Tropsch hydrocarbon synthesis stage to hydrocarbons.

11. The process as claimed in claim 10, in which the reformed gas stream and the hot synthesis gas stream are combined inside a steam reformer vessel in which the steam reforming takes place.

12. The process as claimed in claim 1, in which the reformed gas stream and the cooled synthesis gas stream are kept separate, even when they are both being fed to the Fischer-Tropsch hydrocarbon synthesis stage, at least until they are ultimately fed to the Fischer-Tropsch hydrocarbon synthesis stage.

* * * * *